(12) United States Patent
Kubo et al.

(10) Patent No.: US 6,765,641 B1
(45) Date of Patent: Jul. 20, 2004

(54) DISPLAY DEVICE

(75) Inventors: Masumi Kubo, Nara (JP); Yozo Narutaki, Yamatokoriyama (JP); Yuko Maruyama, Tenri (JP); Kazuhiro Maekawa, Tenri (JP); Takayuki Shimada, Yamatokoriyama (JP); Mikio Katayama, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 712 days.

(21) Appl. No.: 09/061,075

(22) Filed: Apr. 16, 1998

(30) Foreign Application Priority Data

Apr. 18, 1997 (JP) .............................................. 9-102060
Nov. 12, 1997 (JP) .............................................. 9-310878

(51) Int. Cl.[7] ........................ G02F 1/136; G02F 1/1337
(52) U.S. Cl. ......................................... 349/138; 349/43
(58) Field of Search ........................... 349/43, 122, 138

(56) References Cited

U.S. PATENT DOCUMENTS

| | | | | |
|---|---|---|---|---|
| 4,521,079 A | * | 6/1985 | Leenhouts et al. | 349/137 |
| 5,003,356 A | * | 3/1991 | Wakai et al. | 357/4 |
| 5,585,951 A | | 12/1996 | Noda et al. | 349/122 |
| 5,641,974 A | | 6/1997 | den Boer et al. | 349/128 |
| 5,706,064 A | * | 1/1998 | Fukunaga et al. | 349/43 |
| 5,721,601 A | * | 2/1998 | Yamaji et al. | 349/138 |
| 5,742,365 A | * | 4/1998 | Seo | 349/43 |
| 5,835,169 A | * | 11/1998 | Kwon et al. | 349/43 |
| 5,855,177 A | * | 1/1999 | Nakayama et al. | 112/235 |
| 5,883,682 A | * | 3/1999 | Kim et al. | 349/43 |
| 5,909,263 A | * | 6/1999 | Song | 349/43 |
| 5,926,235 A | * | 7/1999 | Han et al. | 349/43 |

* cited by examiner

Primary Examiner—Kenneth Parker
(74) Attorney, Agent, or Firm—Nixon & Vanderhye P.C.

(57) ABSTRACT

A display device, with a pair of substrates provided so as to face each other with a display medium interposed therebetween, includes, on a first substrate of the pair of substrates: switching elements disposed in a matrix; scanning lines and signal lines disposed so as to cross each other; and an interlayer insulating film provided so as to have the switching elements, the scanning lines and the signal lines on one surface thereof and pixel electrodes on the other surface thereof. Each of the pixel electrodes is electrically connected to a drain electrode of one of the switching elements via a contact hole which penetrates through the interlayer insulating film. The interlayer insulating film is made of an organic thin film having a high transparency and covers at least the switching elements, the scanning lines and the signal lines. Furthermore, the interlayer insulating film is provided so as to contact directly with the first substrate in a light-transmitting area which is not shaded at least by the switching elements, the scanning lines and the signal lines.

2 Claims, 17 Drawing Sheets

DISPLAY DEVICE

BACKGROUND OF THE INVENTION

1. Field of the Invention

The present invention relates to a display device such as a liquid crystal display device which is used, for example, for office automation equipment (e.g., a word processor, a personal computer, or the like) or a television set.

2. Description of the Related Art

FIG. 19 shows a configuration of an active matrix substrate which is a part of a conventional liquid crystal display device.

This liquid crystal display device is of the active matrix type in which the active matrix substrate and a counter substrate are disposed so as to face each other with a display medium made of liquid crystals or the like interposed therebetween. The active matrix substrate includes thin-film transistors (hereinafter, referred to as "TFTs") 2 serving as switching elements and pixel capacitances 1 disposed in a matrix.

Gate signal lines 3 each serving as a scanning line for controlling the TFTs 2 are connected to a gate electrode of the respective TFTs 2, thereby driving the TFTs 2 by a signal input thereto. Source signal lines 5 each serving as a signal line for supplying a data signal to the TFTs 2 are connected to a source electrode of the respective TFTs 2, allowing a video signal or the like to be input therefrom. The gate signal lines 3 and the source signal lines 5 are provided so as to cross each other in the vicinity of the TFTs 2.

A pixel electrode 6 and one terminal (i.e., an electrode) of the pixel capacitance 1 are connected to a drain electrode of the TFT 2. The other terminal (i.e., an electrode) of the pixel capacitance 1 is connected to a pixel capacitance line 4. The pixel capacitance lines 4 are electrically connected to a counter electrode formed on the counter substrate in the completed configuration of the liquid crystal display device.

FIG. 20 is a cross-sectional view illustrating the conventional active matrix substrate.

The active matrix substrate includes a gate electrode 12, which is a part of the gate signal line 3, provided on a transparent insulating substrate 11, and a gate insulating film 13 provided so as to cover the gate electrode 12. On the gate insulating film 13, a semiconductor layer 14 is provided so as to overlap the gate electrode 12. A channel protecting layer 15 is provided above a center portion of the semiconductor layer 14. Furthermore, $n^+$-Si layers 16a and 16b to be a source electrode and a drain electrode, respectively, are provided so as to cover edge portions of the channel protecting layer 15 and parts of the semiconductor layer 14 and so as to be separated from each other on the channel protecting layer 15.

An ITO (Indium Tin Oxide) film 9a and a metal layer 17a to be a source signal line 5 are sequentially provided on a part of the $n^+$-Si layer 16a. An ITO film 9b and a metal layer 17b to be a connecting electrode for connecting a drain electrode and a pixel electrode 20 (not shown) are sequentially provided on a part of the $n^+$-Si layer 16b.

A passivation film 18 made of an inorganic thin film is provided on the resultant substrate, and an interlayer insulating film 19, formed of an organic thin film having a high transparency, is provided thereon so as to cover the TFT 2, the gate signal line 3, and the source signal line 5. The pixel electrode 6 is formed on the interlayer insulating film 19. The pixel electrode 6 is connected to the $n^+$-Si layer 16b, i.e., the drain electrode of the TFT 2, by the ITO film 9b which functions as the connecting electrode via a contact hole 7 penetrating through the passivation film 18 and the interlayer insulating film 19.

However, in the case where the gate insulating film 13 and the passivation film 18 made of the inorganic thin film are present between the transparent insulating substrate 11 and the interlayer insulating film 19 made of the organic thin film having a high transparency as in the above, light reflection occurs due to differences in refractive indexes at the interface of the substrate 11 and the gate insulating film 13 and at the interface of the passivation film 18 and the interlayer insulating film 19.

As a result of such reflection, there arises a problem of reduced light transmittance.

SUMMARY OF THE INVENTION

A display device of the present invention has a pair of substrates provided so as to face each other with a display medium interposed therebetween, and further includes, on a first substrate of the pair of substrates: switching elements disposed in a matrix; scanning lines and signal lines disposed so as to cross each other; and an interlayer insulating film provided so as to have the switching elements, the scanning lines and the signal lines on one surface thereof and pixel electrodes on the other surface thereof. Each of the pixel electrodes is electrically connected to a drain electrode of one of the switching elements via a contact hole which penetrates through the interlayer insulating film. The interlayer insulating film is made of an organic thin film having a high transparency and covers at least the switching elements, the scanning lines and the signal lines. Furthermore, the interlayer insulating film is provided so as to contact directly with the first substrate in a light-transmitting area which is not shaded at least by the switching elements, the scanning lines and the signal lines.

In one embodiment, the display device further includes: a gate insulating film at least covering a gate electrode of each of the switching elements; and a passivation film, made of an inorganic thin film, at least covering the switching elements. The gate insulating film and the passivation film are provided between the first substrate and the interlayer insulating film in a region excluding the light-transmitting area. The gate insulating film is a first patterned film which is provided to cover both the light-transmitting area and the region excluding the light-transmitting area on the first substrate and then partially removed in the light-transmitting area. The passivation film is a second patterned film which is provided to cover both the light-transmitting area and the region excluding the light-transmitting area on the first substrate and then partially removed in the light-transmitting area.

In another embodiment, the display device further includes a gate insulating film at least covering a gate electrode of each of the switching elements. The gate insulating film is provided between the first substrate and the interlayer insulating film in a region excluding the light-transmitting area. The gate insulating film is a patterned film which is provided to cover both the light-transmitting area and the region excluding the light-transmitting area on the first substrate and then partially removed in the light-transmitting area.

Preferably, a refractive index of the interlayer insulating film is in the range of about 1.5 to about 2.0.

In one embodiment, the display device further includes a gate insulating film provided on the gate electrodes of each of the switching elements and the scanning lines and under the signal lines between the first substrate and the interlayer insulating film in a region excluding the light-transmitting area. The gate insulating film is a first patterned film which is provided to cover both the light-transmitting area and the region excluding the light-transmitting area on the first substrate and then partially removed in the light-transmitting area while retained on the gate electrodes and the scanning lines and under the signal lines.

Preferably, the display device further includes a passivation film made of an inorganic thin film. The passivation film is provided on the switching elements and the scanning lines and under the signal lines between the first substrate and the interlayer insulating film in the region excluding the light-transmitting area. The passivation film is a second patterned film which is provided to cover both the light-transmitting area and the region excluding the light-transmitting area on the first substrate and then partially retained in the light-transmitting area while retained on the switching elements, the scanning lines and the signal lines.

A first portion of the passivation film located on the scanning lines may be provided so as to cover the edges of a first portion of the gate insulating film located on the scanning lines, and a second portion of the passivation film located on the signal lines may be provided so as to cover the edges of a second portion of the gate insulating film located under the scanning lines.

The passivation film may be patterned by dry-etching.

A pattern width of the gate insulating film may be increased at respective crossing areas of the scanning lines and the signal lines, at a bending portion of a pattern of the scanning lines, and at a bending portion of a pattern of the signal lines.

Similarly, a pattern width of the passivation film may be increased at respective crossing areas of the scanning lines and the signal lines, at a bending portion of a pattern of the scanning lines, and at a bending portion of a pattern of the signal lines.

A display device, to be provided in accordance with another aspect of the present invention, includes a pair of substrates provided so as to face each other with a display medium interposed therebetween, and further includes, on a first substrate of the pair of substrates: switching elements disposed in a matrix; scanning lines and signal lines disposed so as to cross each other; and an interlayer insulating film provided so as to have the switching elements, the scanning lines and the signal lines on one surface thereof and pixel electrodes on the other surface thereof, each of the pixel electrodes being electrically connected to a drain electrode of one of the switching elements via a contact hole which penetrates through the interlayer insulating film. The display device further includes, between the first substrate and the interlayer insulating film, at least one of a gate insulating film, which at least covers a gate electrode of each of the switching elements, and a passivation film, which is made of an inorganic thin film and at least covers the switching elements. The interlayer insulating film is made of an insulating film having a high transparency and a refractive index in the range of about 1.8 to about 2.0.

Thus, the invention described herein makes possible the advantage of providing a display device capable of realizing a bright display by improving light transmittance.

This and other advantages of the present invention will become apparent to those skilled in the art upon reading and understanding the following detailed description with reference to the accompanying figures.

DESCRIPTION OF THE PREFERRED EMBODIMENTS

Figure 1:
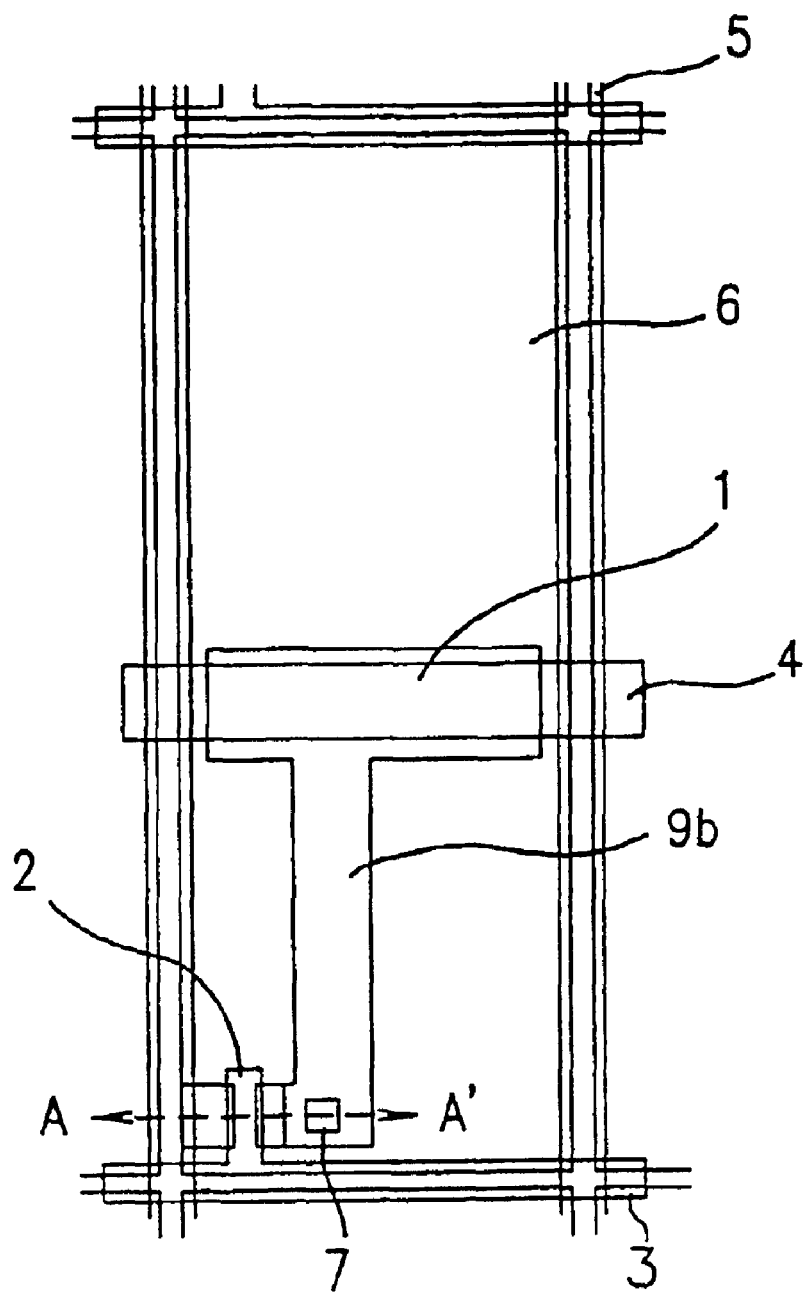
FIG. 1 is a plan view showing one pixel region of an active matrix substrate in a liquid crystal display device according to Example 1 of the present invention.

According to the present invention, an interlayer insulating film directly contacts a substrate in a light-transmitting area which is not shaded at least by a switching element, a scanning line, and a signal line. As a result, unlike the conventional display device described previously, an interface of the substrate and a gate insulating film and an interface of a passivation film and the interlayer insulating film do not exist. Thus, light reflection resulting from differences in refractive indexes at the interfaces does not occur.

Moreover, according to the present invention, a film for forming the passivation film is formed so as to cover both the light-transmitting area and a region excluding the light-transmitting area on the substrate. Then, the film is patterned so as to remove a portion of the film covering the light-transmitting area, thereby providing the passivation film covering at least the switching element between the substrate and the interlayer insulating film positioned in the region excluding the light-transmitting area. In such a case, since the passivation film formed of an inorganic thin film is present between the interlayer insulating film, made of an organic thin film having a high transparency and including an ionic substance, and the switching element, reliability of the switching element improves. Moreover, a film for forming the gate insulating film is formed so as to cover both the light-transmitting area and a region excluding the light-transmitting area on the substrate. Then, the film is patterned so as to remove a portion of the film covering the light-transmitting area, thereby providing the gate insulating film covering at least a gate electrode of the switching element between the substrate and the interlayer insulating film in the region excluding the light-transmitting area.

Furthermore, according to the present invention, the gate insulating film is provided and no passivation film is provided between the substrate and the interlayer insulating film in the region excluding the light-transmitting area. As a result, a level difference between the light-transmitting area and the region excluding the light-transmitting area is equal to a thickness of the gate insulating film. Therefore, it is easy to planarize the surface of the substrate by the interlayer insulating film. In addition, since the step of forming a film for forming the passivation film and the step of patterning are not required, the fabrication steps are simplified.

In the case where the substrate is formed of glass, its refractive index is in the range of about 1.5 to about 1.6. In the case where a pixel electrode is formed of an ITO film, its refractive index is in the range of about 1.8 to about 2.0. Therefore, according to the present invention, the refractive index of the interlayer insulating film is set to be in the range of about 1.5 to about 2.0 so as to reduce differences in refractive indexes at the interface of the substrate and the interlayer insulating film and at the interface of the interlayer insulating film and the pixel electrode. Accordingly, it is possible to reduce the occurrence of light reflection at the interfaces.

In this manner, by employing the structure in which the transparent insulating substrate directly contacts the interlayer insulating film made of an organic thin film having a high transparency in the light-transmitting area, the interface of the substrate and the gate insulating film and the interface of the passivation film formed of an inorganic thin film and the interlayer insulating film do not exist. As a result, a reduction in light transmittance of the display device caused by light reflection due to differences in refractive indexes at the interfaces is not generated.

However, if a portion on the scanning line is removed when the gate insulating film in the light-transmitting area is removed by patterning, the scanning line may be damaged upon etching the gate insulating film or the signal line, resulting in display defects due to the breakage of the scanning line or the like. Also, if a region having no gate insulating film exists under the signal line, a level difference is generated at a boundary between a region having the gate insulating film and the region having no gate insulating film, resulting in display defects due to the breakage of the signal line or the like. Accordingly, in the present invention, it is possible to prevent display defects caused by the breakage of the scanning line and the signal line by, upon patterning the gate insulating film, removing a portion of the film covering the light-transmitting area while retaining the film portions above the gate electrode and the scanning line and beneath the signal line.

In the structure where the passivation film is provided, if a portion on the scanning line is removed when portion of the film covering the light-transmitting area is removed by patterning, the gate insulating film may be damaged upon etching the passivation film. Moreover, in the case where defects of the gate insulating film exist on the scanning line, the defective portion may damage the scanning line, thereby causing display defects. In addition, if a portion on the signal line is removed when the passivation film in the light-transmitting area is removed by patterning, the signal line may be damaged upon etching the passivation film, resulting in display defects due to the breakage of the scanning line or the like. Accordingly, in the present invention, it is possible to prevent defects of the gate insulating film and display defects due to the breakage of the scanning line and the signal line by, upon patterning the passivation film, removing a portion of the film covering the light-transmitting area while retaining the film portions above the switching element, the scanning line, and the signal line.

Moreover, according to the present invention, the passivation film is provided so as to cover the edge of the gate insulating film on the scanning line and under the signal line. As a result, it is possible to prevent the glass substrate under the edges of the gate insulating film from being etched. This aspect will be further explained below.

As a material for the gate insulating film and the passivation film, an insulating material such as silicon nitride is generally used. Regarding the gate insulating film, however, it is necessary to form the film having a dense structure in order to assure reliability of the device. Regarding the passivation film, on the other hand, since the interlayer insulating film made of an organic thin film having a high transparency is present thereon, it is not necessary to form the film as dense as the gate insulating film. Thus, the passivation film is formed to have a coarse structure with such a degree that the layers positioned therebelow are not damaged when the passivation film is formed. As a result, in the case where wet etching is performed for the gate insulating film and the passivation film, the etching rate of the passivation film becomes significantly larger than that of the gate insulating film. For example, when BHF is used for the etching of the silicon nitride film, the etching rate of the passivation film is significantly larger than that of the gate insulating film, and the etching rate of the glass substrate substantially equals that of the passivation film. Moreover, a contact hole for connecting the drain electrode and the pixel electrode with each other is formed in the passivation film. Since a pixel having an insufficiently opened contact hole becomes a bright point on the displayed image, it is necessary to set an etching time for the passivation film sufficiently longer than the time required for a just-etching (i.e., the time required for a thickness of the passivation film to become zero by the etching). In the case where the edges of the gate insulating film are not covered by the passivation film, the glass substrate starts to be etched after the just-etching time is passed upon the etching of the passivation film. However, since the etching rate of the gate insulating film is smaller than that of the glass substrate, the glass substrate under the edges of the gate insulating film is etched. As a result, the edges of the gate insulating film rise just like a hood and the gate insulating film is thereby peeled off, resulting in defects.

Thus, by providing the passivation film so as to cover the edges of the gate insulating film portions on the scanning line and the signal line, the glass substrate under the edges of the gate insulating film can be prevented from being etched upon etching the passivation film since the passivation film and a resist pattern are present on the edges of the gate insulating film. Thus, it is possible to prevent display defects caused by the peeling-off of the gate insulating film.

Moreover, according to the present invention, it is possible to prevent the peeling-off of the gate insulating film by patterning the passivation film by dry-etching.

Specifically, $CF_4+O_2$ is generally used for the dry-etching of the silicon nitride. Since the $CF_4+O_2$ does not react with the glass substrate, the glass substrate under the edges of the gate insulating film is not etched without covering the edges of the gate insulating film with the passivation film. Therefore, it is possible to prevent display defects caused by the peeling-off of the gate insulating film.

Moreover, in the case where each layer is etched by wet-etching, etching defects are likely to be caused by etchant accumulated in a crossing area of the scanning line and the signal line, a bending portion of the scanning line pattern, and a bending portion of the signal line pattern when the substrate is taken out from an etchant tank. In addition, the etchant is likely to penetrate into the crossing section of the scanning line and the signal line, thereby causing a short-circuit between the scanning line and the signal line. Therefore, in the present invention, the pattern width of the gate insulating film and the pattern width of the passivation film are increased at the crossing section of the scanning line and the signal line, the bending portion of the scanning line pattern, and the bending portion of the signal line pattern. As a result, the accumulation of the etchant or the penetration of the etchant is less likely to be caused.

According to the present invention, the interlayer insulating film having a refractive index in the range of about 1.8 to about 2.0 is used. In the case where the gate insulating film and the passivation film are provided between the interlayer insulating film and the substrate, the interface of the substrate and the gate insulating film and the interface of the passivation film and the interlayer insulating film exist. However, since the refractive index of the gate insulating film or that of the passivation film is generally in the range of about 1.8 to about 2.0, and the refractive index of the pixel electrode is generally in the range of about 1.8 to about 2.0, differences in the refractive indexes at the interface of the substrate and the gate insulating film and at the interface of the passivation film and the interlayer insulating film are small. Thus, even when the gate insulating film and the passivation film are provided between the interlayer insulating film and the substrate in the light-transmitting area, a reduction in transmittance resulting from light reflection does not occur.

The above aspects are also applicable to the case where the gate insulating film is provided between the interlayer insulating film and the substrate in the light-transmitting area.

Hereinafter, the present invention will be described by way of illustrative, but non-limiting examples with reference to the accompanying drawings. In the accompanying drawings, a component having the same function as that in the conventional liquid crystal display device is denoted by the same reference numeral as used therein.

EXAMPLE 1

Figure 2:
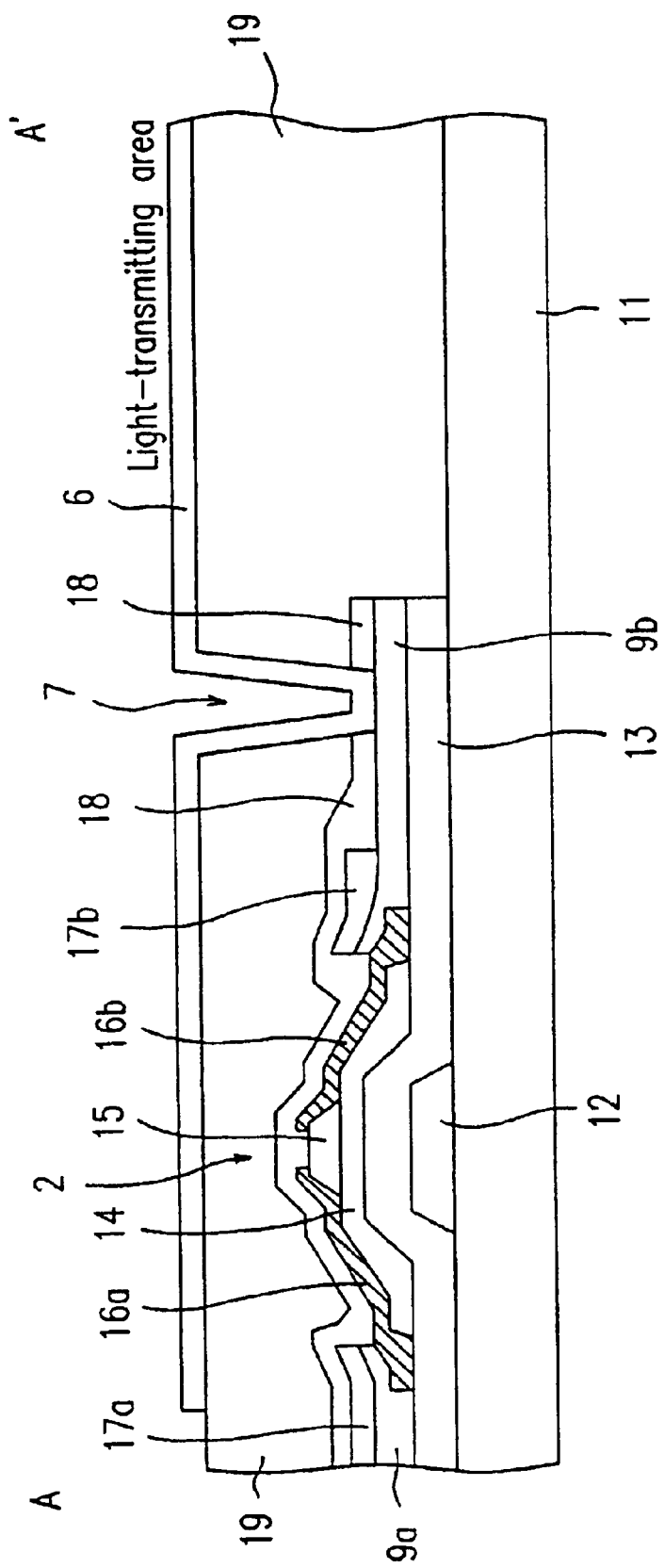
FIG. 2 is a cross-sectional view showing the active matrix substrate taken along line A–A' in FIG. 1.

FIG. 1 is a plan view showing a pixel region of an active matrix substrate in a liquid crystal display device according to Example 1 of the present invention. FIG. 2 is a cross-sectional view of the active matrix substrate taken along line A–A' in FIG. 1.

The active matrix substrate includes a gate signal line 3 and a gate electrode 12 which is a part of the gate signal line 3 provided on a transparent insulating substrate 11, and a gate insulating film 13 provided thereon so as to cover a region excluding a light-transmitting area. On the gate insulating film 13, a semiconductor layer 14 is provided so as to overlap the gate electrode 12. A channel protecting layer 15 is provided above a center portion of the semiconductor layer 14. Furthermore, $n^+$-Si layers 16a and 16b to be a source electrode and a drain electrode, respectively, are provided so as to cover edge portions of the channel protecting layer 15 and parts of the semiconductor layer 14 and so as to be separated from each other on the channel protecting layer 15.

An ITO film 9a and a metal layer 17a to be a source signal line 5 are sequentially provided on a part of the $n^+$-Si layer 16a. An ITO film 9b and a metal layer 17b to be a connecting electrode for connecting the drain electrode and a pixel electrode 6 with each other are sequentially provided on a part of the $n^+$-Si layer 16b. The ITO film 9b extends over a pixel capacitance line 4 which is formed as described later, and an overlapped portion of the ITO film 9b and the pixel capacitance line 4 with the gate insulating film 13 interposed therebetween serves as a pixel capacitance 1.

A passivation film 18 made of an inorganic thin film is provided on the resultant substrate in the region excluding the light-transmitting area. An interlayer insulating film 19 formed of an organic thin film having a high transparency is provided thereon so as to cover a TFT 2, the gate signal line 3, and the source signal line 5. The pixel electrode 6 is provided on the interlayer insulating film 19. The pixel electrode 6 is connected to the $n^+$-Si layer 16b (i.e., the drain electrode of the TFT 2) by the ITO film 9b which functions as the connecting electrode via a contact hole 7 penetrating through the passivation film 18 and the interlayer insulating film 19.

The active matrix substrate is disposed so as to face a counter substrate including a counter electrode. A display medium formed of a liquid crystal material or the like is interposed between the active matrix substrate and the counter substrate.

The liquid crystal display device according to Example 1 of the present invention is fabricated, for example, in the following manner.

First, the gate signal line 3, the gate electrode 12 which is a part of the gate signal line 3, and the pixel capacitance line 4 are formed on the transparent insulating substrate 11. Next, the gate insulating film 13, the semiconductor layer 14, the channel protecting layer 15, and the n$^+$-Si layers 16a and 16b to be the source electrode and the drain electrode, respectively, are sequentially formed thereon in this order. The fabrication steps so far may be performed in the same manner as that in the conventional liquid crystal display device except for the formation of the gate insulating film 13.

The gate insulating film 13 is formed as follows. After forming a film for forming the gate insulating film on the substrate, etching is performed so as to remove the film covering an opening which is to be the light-transmitting area. In this manner, the gate insulating film 13 is formed.

Herein, the "light-transmitting area" refers to a region which is not shaded at least by the TFT, the gate signal line, and the source signal line. However, in the case where a portion of such a region is shaded by the aforementioned connecting electrode, pixel capacitance line, or other members, such a portion is not considered as the light-transmitting area. In the case where a color filter or a black matrix is provided on the counter substrate, a region shaded by the black matrix is not included in the light-transmitting area.

Next, the ITO films 9a and 9b which are transparent conductive films and the metal layers 17a and 17b constituting the source signal line and the connecting electrode are sequentially formed by sputtering, and then patterning is subsequently performed. Although the source signal line may be formed only of the metal layer alone, two-layered structure having the metal layer 17a and the ITO film 9a is more advantageous. This is because even if a part of the metal layer 17a is missing, such a portion is electrically connected by the ITO film 9a, thereby reducing the occurrence of breakage of the source signal line.

Subsequently, a Si—N film is formed on the resultant substrate as a film for forming the passivation film 18 made of an inorganic thin film. Then, the contact hole 7 is formed and the film positioned in the opening (i.e., the light-transmitting area) is removed. In this manner, the passivation film 18 is formed.

Then, as the interlayer insulating film 19, a photosensitive acrylic resin, for example, is formed by spin coating so as to have a thickness of about 3 μm. Thereafter, the acrylic resin is exposed to light in accordance with a desired pattern and subsequently treated with an alkali solution. As a result, only a portion exposed to light is etched by the alkali solution, thereby forming the contact hole 7 penetrating through the interlayer insulating film 19.

According to the patterning by the alkali development as describe in the above, it is possible to obtain a satisfactory tapered shape of the contact hole 7. In addition, by employing the photosensitive acrylic resin as the interlayer insulating film 19, it becomes possible to form a thin film by spin coating. As a result, a thin film with a thickness of several micrometers can be readily formed. Furthermore, a step of applying a photoresist at the time of patterning is not required. Thus, the method for fabricating the liquid crystal display device according to Example 1 of the present invention has advantages over the conventional method in terms of productivity.

Although the photosensitive acrylic resin may be colored before its application, the resin can be rendered transparent by performing an exposure treatment for the entire surface thereof after the patterning. Such a treatment to render the resin transparent may be chemically performed.

Next, the transparent conductive film is formed by sputtering, and then patterned so as to form the pixel electrode 6. By this patterning, the pixel electrode 6 is connected to the ITO film 9b which functions as a connecting electrode connected to the n$^+$-Si layer 16b (i.e., the drain electrode of the TFT 2) via the contact hole 7 penetrating through the interlayer insulating film 19 and the passivation film 18. In this manner, by employing the transparent conductive film as the connecting electrode for connecting the drain electrode of the TFT 2 and the pixel electrode, light transmittance can be improved.

The thus obtained active matrix substrate is attached to the counter substrate including the counter electrode provided on a transparent insulating substrate. A liquid crystal material is injected between the active matrix substrate and the counter substrate. In this manner, the liquid crystal display device according to Example 1 of the present invention is completed.

Figure 3:
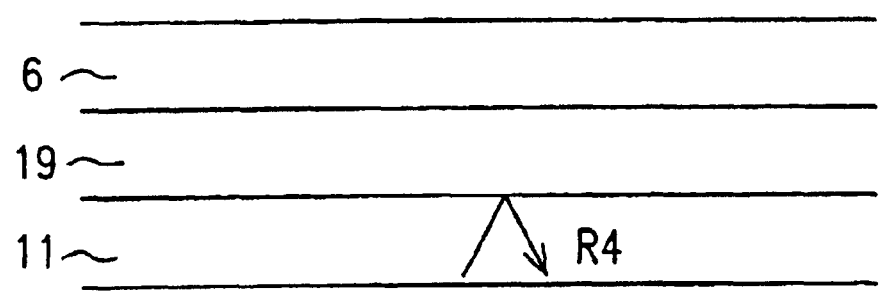
FIG. 3 is a view illustrating the structure of films in a light-transmitting area of the active matrix substrate in the liquid crystal display device according to Example 1 of the present invention.

In the thus obtained liquid crystal display device according to Example 1 of the present invention, as shown in FIG. 3, the gate insulating film positioned in the opening (i.e., the light-transmitting area of the active matrix substrate) is removed by etching. Since the passivation film 18 in that portion is also removed at the time of etching for forming the contact hole 7, the interlayer insulating film 19 directly contacts the transparent insulating substrate 11 in the opening, and the pixel electrode 6 is provided on the interlayer insulating film 19.

In the case where a glass substrate is used as the substrate 11, the refractive index n11 of the substrate 11 is in the range of about 1.5 to about 1.6. In the case where a photosensitive acrylic resin film is used as the interlayer insulating film 19, the refractive index n19 of the interlayer insulating film 19 is also in the range of about 1.5 to about 1.6, which is a value close to the refractive index n11 of the glass substrate 11. In such a case, when light is incident from the side of the substrate 11, a reflectance R4 (%) at the interface of the substrate 11 and the interlayer insulating film 19 is represented by:

$$R4=(n11-n19)^2/(n11+n19)^2 \times 100,$$

resulting in R4=0 to 0.1%. Accordingly, light reflection rarely occurs at the interface of the substrate 11 and the interlayer insulating film 19. As a result, the amount of transmitted light is hardly attenuated, thereby realizing a bright white display.

Figure 21:
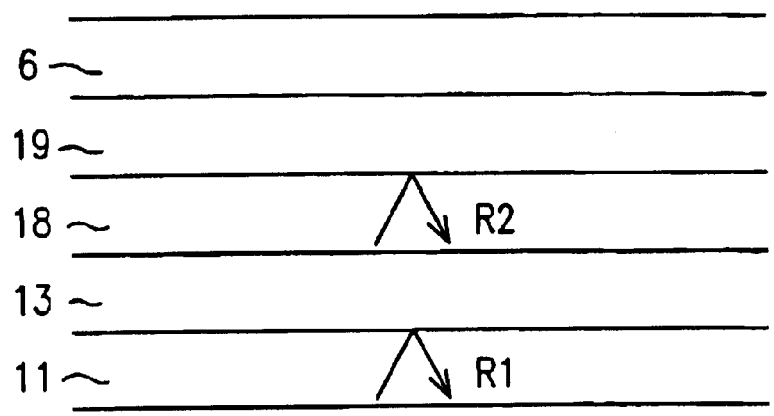
FIG. 21 is a view illustrating the structure of films in a light-transmitting area of the conventional active-matrix substrate.

On the other hand, in the conventional active matrix substrate, as shown in FIG. 21, the gate insulating film 13, the passivation film 18, the interlayer insulating film 19 and the pixel electrode 6 are sequentially provided on the transparent insulating substrate 11 in this order in the opening which is the light-transmitting area.

In the conventional active matrix substrate, the refractive index n11 of the substrate 11 is in the range of about 1.5 to about 1.6. In the case where a Si—N film is used as the gate insulating film 13, the refractive index n13 of the gate insulating film 13 is in the range of about 1.8 to about 2.0, which is considerably different from the refractive index n11 of the substrate 11. In such a case, when light is incident from the side of the substrate 11, a reflectance R1 (%) at the interface of the substrate 11 and the gate insulating film 13 is represented by:

$$R1=(n11-n13)^2/(n11+n13)^2 \times 100,$$

resulting in R1=0.35% to 2.0%. Accordingly, the amount of transmitted light is attenuated with respect to the amount of incident light by an amount corresponding to the reflectance at the interface of the substrate 11 and the gate insulating film 13. As a result, the brightness of the white display is reduced.

In the case where a Si—N film is used as the passivation film 18, the refractive index n18 of the passivation film 18 is in the range of about 1.8 to about 2.0. In the case where a photosensitive acrylic resin film is used as the interlayer insulating film 19, the refractive index n19 of the interlayer insulating film 19 is in the range of about 1.5 to about 1.6, which is different from the refractive index n18 of the passivation film 18. In such a case, when light is incident from the side of the substrate 11, a reflectance R2 (%) at the interface of the passivation film 18 and the interlayer insulating film 19 is represented by:

$$R2=(n18-n19)^2/(n18+n19)^2 \times 100,$$

resulting in R2=0.35% to 2.0%. Accordingly, the amount of transmitted light is attenuated with respect to the amount of incident light by an amount corresponding to the reflectance at the interface of the passivation film 18 and the interlayer insulating film 19. As a result, the brightness of the white display is reduced.

As described above, according to the conventional active matrix substrate, light reflection occurs at the interface of the substrate 11 and the gate insulating film 13 and the interface of the passivation film 18 and the interlayer insulating film 19. As a result, the amount of transmitted light is attenuated due to the light reflection represented by a reflectance R3 (%) shown below.

$$R3=R1+(100-R1)/100 \times R2,$$

resulting in R3=0.70% to 4.0%. Accordingly, the amount of transmitted light is attenuated by an amount corresponding to the reflectance, thereby reducing the brightness of the white display.

As described above, in the liquid crystal display device according to Example 1 of the present invention, the interface of the substrate 11 and the gate insulating film 13 and the interface of the passivation film 18 and the interlayer insulating film 19 do not exist in the light-transmitting area. As a result, it is possible to increase the brightness of the white display, thereby realizing a liquid crystal display device with low power consumption.

The above aspects are also applicable to the case where light is incident from the active matrix substrate side or the case where light is incident from the counter substrate side.

According to the liquid crystal display device of Example 1, since the passivation film 18 is provided between the interlayer insulating film 19 and the TFT 2, reliability of the TFT 2 can be improved.

EXAMPLE 2

Figure 4:
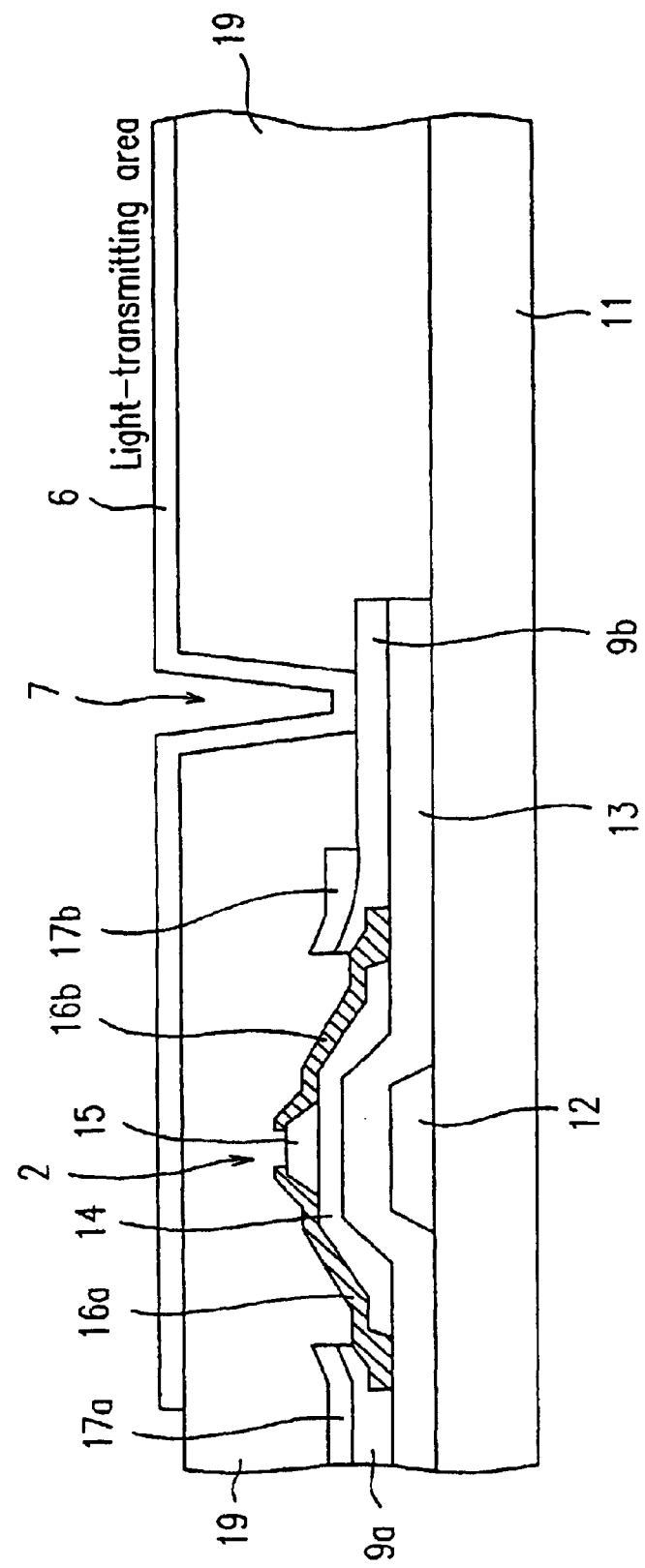
FIG. 4 is a cross-sectional view showing a portion of an active matrix substrate in a liquid crystal display device according to Example 2 of the present invention.

FIG. 4 is a cross-sectional view showing a part of an active matrix substrate in a liquid crystal display device according to Example 2 of the present invention.

The active matrix substrate of Example 2 includes no passivation film made of an inorganic thin film, and an interlayer insulating film 19 made of an organic thin film having a high transparency is directly provided on a TFT 2, a gate signal line, and a source signal line. The other structures of the active matrix substrate may be the same as those in Example 1, and thus, explanations thereof are omitted herein.

Figure 5:
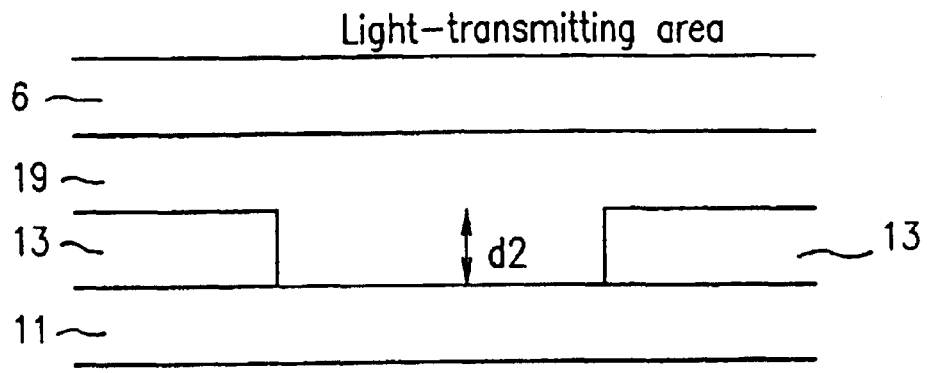
FIG. 5 is a view illustrating the structure of films in the vicinity of a light-transmitting area in the active matrix substrate of the liquid crystal display device according to Example 2 of the present invention.

According to the liquid crystal display device of Example 2, as shown in FIG. 5, a level difference between a light-transmitting area and a region excluding the light-transmitting area becomes only a distance d2 which is equal to the thickness of the gate insulating film 13. Accordingly, the surface of the substrate can be readily planarized by the interlayer insulating film 19.

Figure 6:
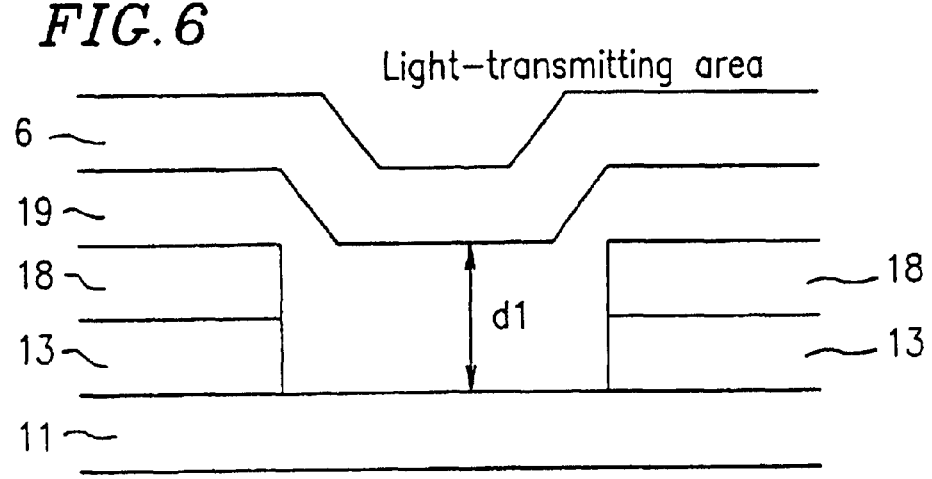
FIG. 6 is a view illustrating the structure of films in the vicinity of a light-transmitting area in the active matrix substrate of the liquid crystal display device according to Example 1 of the present invention.

On the other hand, according to the liquid crystal display device of Example 1, as shown in FIG. 6, a level difference between the light-transmitting area and the region excluding the light-transmitting area becomes a distance d1 which is equal to the sum of the thickness of the gate insulating film 13 and the thickness of the passivation film 18. Therefore, it is difficult to planarize the surface of the substrate by the interlayer insulating film 19. Moreover, since wiring such as the source signal line or the gate signal line is provided in a region other than the opening, an actual level difference between the light-transmitting area and the region excluding the light-transmitting area is greater than the distance d1. Thus, the planarization of the substrate by the interlayer insulating film 19 is more difficult to be performed, thereby inducing leakage of light at the area where the level difference exists. Accordingly, the display characteristics may be deteriorated.

According to the liquid crystal display device of Example 2, a film for forming the gate insulating film is formed, and portion of the film covering the light-transmitting area is removed by etching. According to the liquid crystal display device of Example 1, on the other hand, the step of forming a film for forming the passivation film, the step of etching the film so as to form the contact hole 7, and the step of removing a portion of the film covering the light-transmitting area are further required.

As described above, the liquid crystal display device according to Example 2 of the present invention realizes ease of the flattening of the substrate surface by the interlayer insulating film 19 and a reduced number of fabrication steps. Therefore, it is possible to reduce the cost of the liquid crystal display device.

EXAMPLE 3

Figure 7:
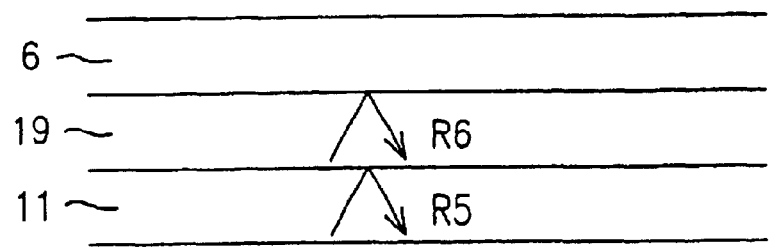
FIG. 7 is a view illustrating the structure of films in a light-transmitting area of an active matrix substrate in a liquid crystal display device according to Example 3 of the present invention.

FIG. 7 is a view illustrating a structure of films in a light-transmitting area of an active matrix substrate in a liquid crystal display device according to Example 3 of the present invention.

In the active matrix substrate of Example 3, an interlayer insulating film 19 made of an organic thin film having a high transparency directly contacts a transparent insulating substrate 11 in the light-transmitting area, and a pixel electrode 6 is provided thereon. The interlayer insulating film 19 is formed of a material with a refractive index n19 in the range of about 1.5 to about 2.0. The other structures of the active matrix substrate may be the same as those in Example 1 or Example 2, and thus, explanations thereof are omitted herein.

The refractive index n11 of the substrate 11 is in the range of about 1.5 to about 1.6. The refractive index n19 of the interlayer insulating film 19 is in the range of about 1.5 to about 2.0. When light is incident from the side of the substrate 11, a reflectance R5 (%) at the interface of the substrate 11 and the interlayer insulating film 19 is represented by:

$$R5=(n11-n19)^2/(n11+n19)^2 \times 100,$$

resulting in R5=0% to 2.0%.

The refractive index n19 of the interlayer insulating film 19 is in the range of about 1.5 to about 2.0. In the case where an ITO film is used as the pixel electrode 6, the refractive index n6 of the pixel electrode 6 is in the range of about 1.8 to about 2.0. When light is incident from the side of the substrate 11, a reflectance R6 (%) at the interface of the interlayer insulating film 19 and the pixel electrode 6 is represented by:

$$R6=(n19-n6)^2/(n19+n6)^2\times 100,$$

resulting in R6=0% to 2.0%.

When the reflection at the interface of the substrate 11 and the interlayer insulating film 19 and the reflection at the interface of the interlayer insulating film 19 and the pixel electrode 6 are taken into consideration, a reflectance R7 (%) in the opening through which light transmits is represented by:

$$R7=R5+(100-R5)/100\times R6,$$

resulting in R7=0.4% to 2.0%.

In the case where the refractive index n11 of the substrate 11 is in the range of about 1.5 to about 1.6, and the refractive index n6 of the pixel electrode 6 is in the range of about 1.8 to about 2.0, if the refractive index n19 of the interlayer insulating film 19 is not in the range of about 1.5 to about 2.0, R7 which is determined by the combination of the aforementioned R5 and R6 exceeds the range of 0.4% to 2.0%. Thus, the amount of transmitted light in the light-transmitting opening is attenuated, resulting in a reduction in light transmittance.

Figure 8:
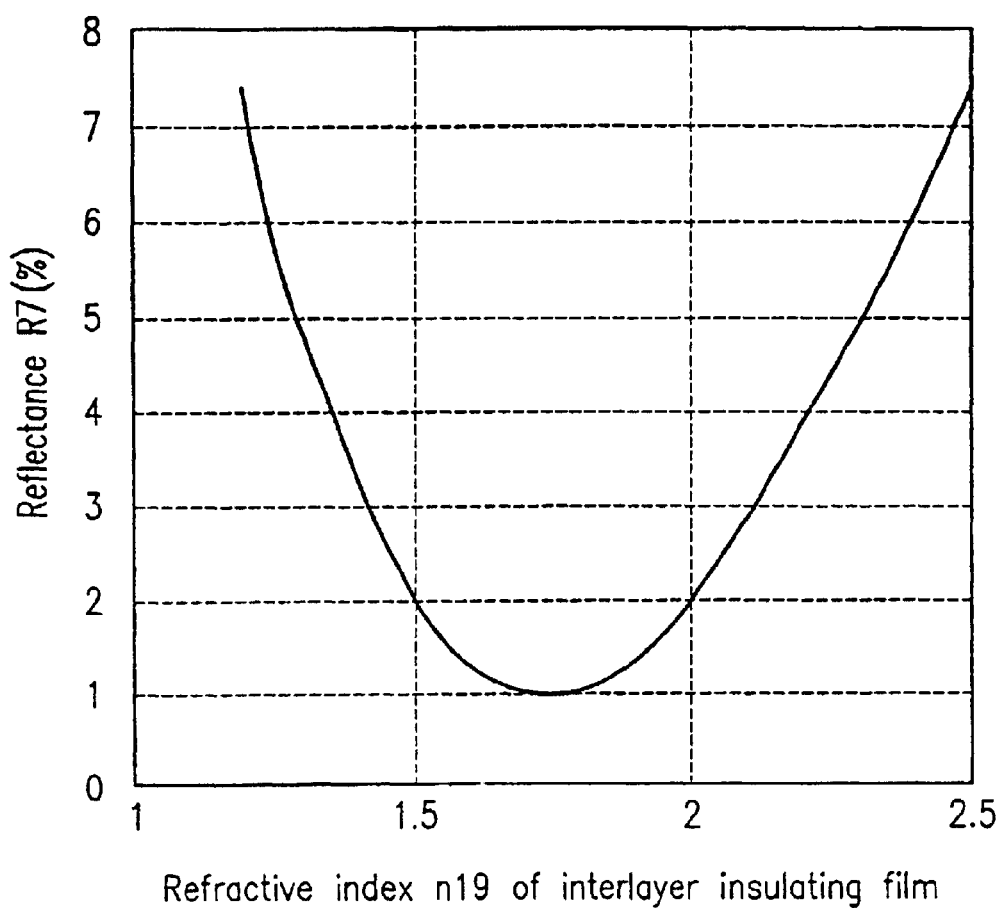
FIG. 8 is a graph showing the relationship between a refractive index n19 of an interlayer insulating film and a reflectance R7 in the liquid crystal display device according to Example 3 of the present invention.

FIG. 8 shows a relationship between a refractive index n19 of the interlayer insulating film 19 and a reflectance R7 in the case where the refractive index n11 of the substrate 11 is 1.5, and the refractive index n6 of the pixel electrode 6 is 2.0. As can be understood from the graph shown in FIG. 8, a reflectance R7 can be maintained at 2.0% or lower when the refractive index n19 of the interlayer insulating film 19 is in the range of 1.5 to 2.0.

As described above, according to the liquid crystal display device of Example 3, since the refractive index n19 of the interlayer insulating film 19 is in the range of about 1.5 to about 2.0, it is possible to increase the brightness of the white display, thereby realizing the liquid crystal display device with low power consumption.

As a material for the interlayer insulating film 19 having a refractive index n19 in the range of about 1.5 to about 2.0, acrylic resin, polyimide, polyamide, epoxy, or the like may be employed.

EXAMPLE 4

Figure 9:
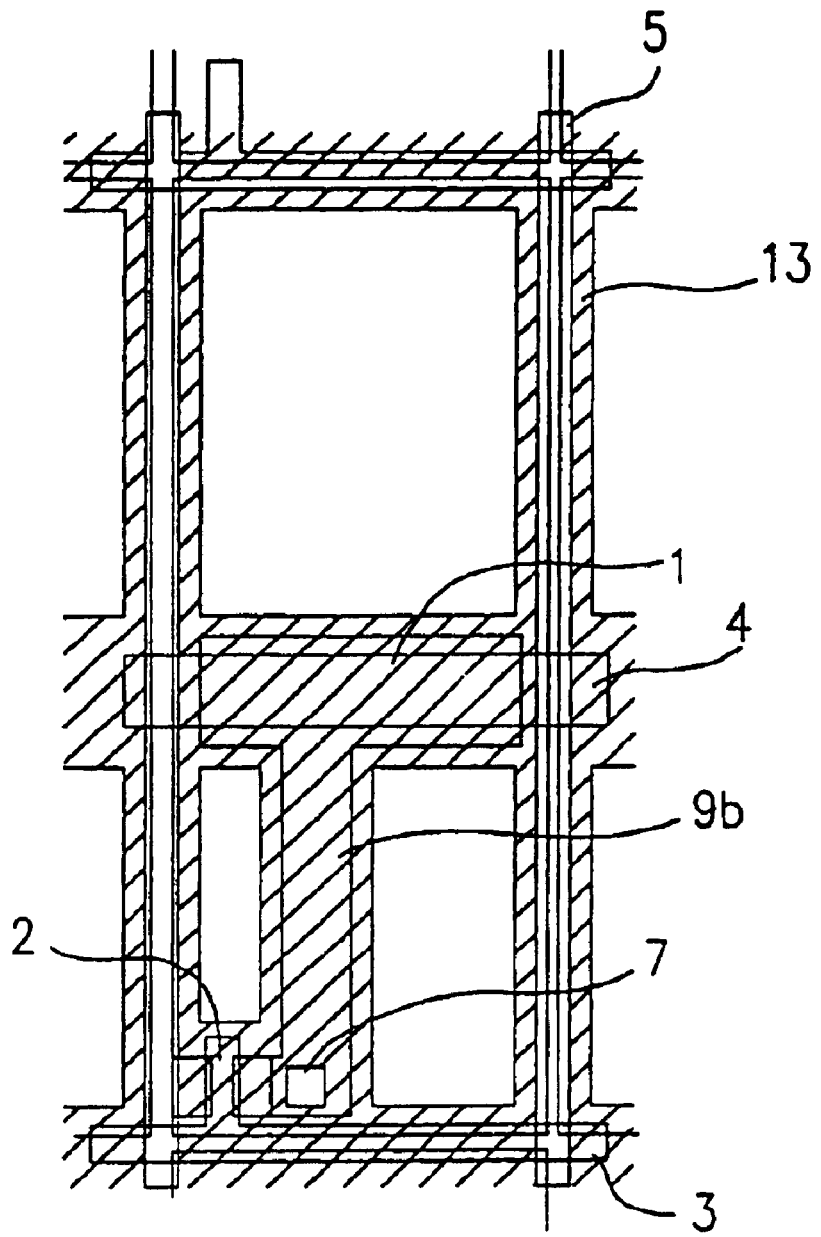
FIG. 9 is a plan view showing a pixel region of an active matrix substrate in a liquid crystal display device according to Example 4 of the present invention.

FIG. 9 is a plan view showing a pixel region of an active matrix substrate in a liquid crystal display device according to Example 4 of the present invention.

In the active matrix substrate of Example 4, when a gate insulating film 13 positioned in a light-transmitting area is removed by patterning, portions of the gate insulating film 13 located on a gate electrode 12 and a gate signal line 3, and under a source signal line 5 are retained.

As described in the aforementioned Example 1 or Example 2, by removing a portion of the gate insulating film 13 or of a passivation film 18 positioned in the light-transmitting area of the active matrix substrate by etching so as to provide an interlayer insulating film 19 directly on a transparent insulating substrate 11, it is possible to increase the brightness of the white display, thereby realizing the liquid crystal display device with low power consumption.

However, if a portion of the gate insulating film 13 located on the gate signal line 3 is removed when the gate insulating film 13 in the light-transmitting area is removed by patterning, the gate signal line 3 may be damaged upon etching the gate insulating film 13. As a result, display defects due to the breakage of the gate signal line 3 may occur. Furthermore, if the gate signal line 3 is exposed during etching steps of layers performed after the patterning of the gate insulating film 13, the gate signal line 3 may be damaged, resulting in defects caused by the breakage of the line.

Accordingly, as shown in FIG. 9, by retaining a portion of the gate insulating film 13 located on the gate signal line 3 upon patterning the gate insulating film 13, the gate insulating film 13 or each layer deposited thereon can be etched to be patterned without damaging the gate signal line 3. As a result, it is possible to prevent defects such as a line breakage from occurring in the pattern of the gate signal line 3.

Figure 10:
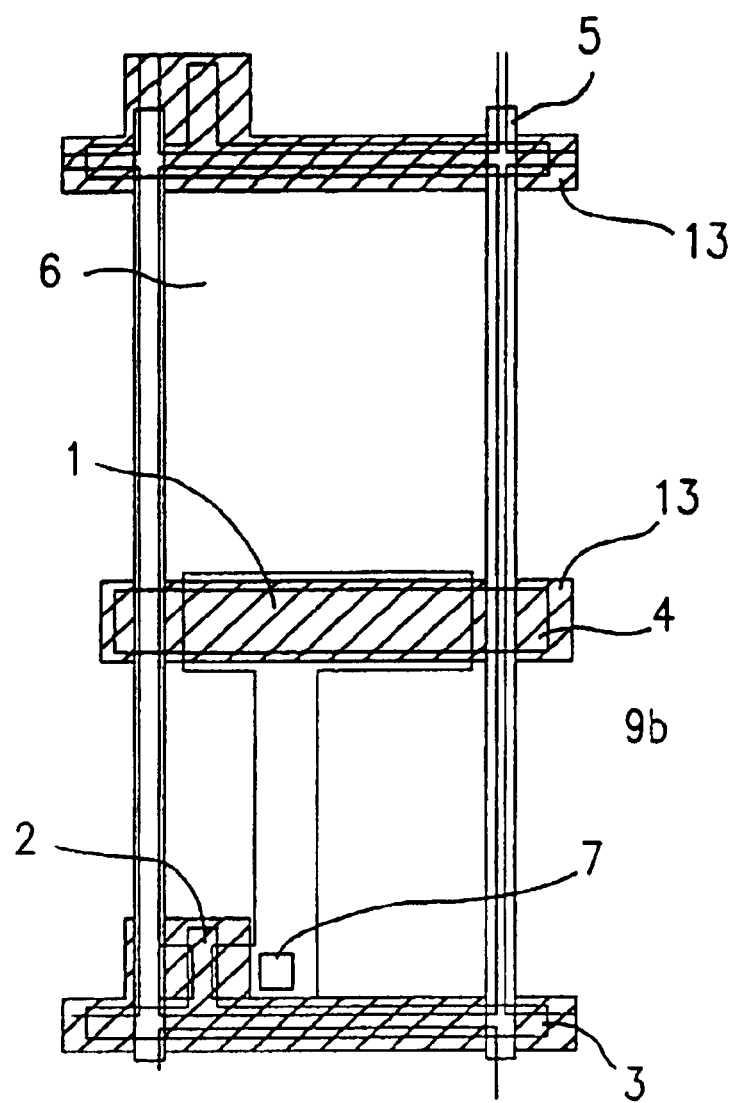
FIG. 10 is a plan view showing an active matrix substrate according to Example 4 of the present invention in which portion of a gate insulating film positioned under a source signal line is removed.

Moreover, as shown in FIG. 10, if a region having no gate insulating film 13 exists under the source signal line 5, a level difference is generated at a boundary of a region having the gate insulating film 13 and the region without the gate insulating film 13. As a result, display defects due to the breakage of the source signal line 5 or the like may be generated.

Accordingly, as shown in FIG. 9, by retaining a portion of the gate insulating film 13 located under the source signal line 5 at the time of the patterning of the gate insulating film 13, a level difference between a region having the gate insulating film 13 and a region without the gate insulating film 13 is not generated under the source signal line 5. Thus, it is possible to prevent defects such as a line breakage from occurring in the pattern of the source signal line 5.

Furthermore, as shown in FIG. 9, by retaining a portion of the gate insulating film 13 located under the ITO film 9b serving as a connecting electrode for connecting a pixel electrode 6 and a drain electrode of a TFT 2, defects caused by a line breakage in the ITO film 9b can be prevented.

EXAMPLE 5

According to Example 5 of the present invention, when a passivation film 18 in a light-transmitting area of an active matrix substrate is removed by patterning, portions of the passivation film 18 positioned on a gate electrode 12, a gate signal line 3, and a source signal line 5 are retained.

As described in aforementioned Example 1, by forming the passivation film 18 made of an inorganic thin film under an interlayer insulating film 19 made of an organic thin film having a high transparency, it is possible to improve the reliability of a TFT 2. Moreover, by removing a gate insulating film 13 or the passivation film 18 positioned in the light-transmitting area of the active matrix substrate by etching so as to provide the interlayer insulating film 19 directly onto a transparent insulating substrate 11, the brightness of the white display can be increased, thereby realizing the liquid crystal display device with low power consumption.

However, if a portion of the passivation film 18 located on the gate signal line 3 is removed when the passivation film 18 positioned in the light-transmitting area is removed by patterning, the gate insulating film 13 may be damaged upon etching the passivation film 18. In the case where defects of the gate insulating film 13 are located on the gate signal line 3, the defective portion may damage the gate signal line 3, thereby causing defects.

Accordingly, by retaining the portion of the passivation film 18 positioned on the gate signal line 3 upon patterning the passivation film 18, it is possible to prevent the gate signal line 3 from being damaged upon etching the passivation film 18. The "damage to the gate signal line 3" herein includes not only direct damages but indirect damages such as peeling-off of the pattern of the gate signal line 3 resulting from a damage to the substrate 11 positioned under the gate signal line 3.

In addition, if a portion of the passivation film 18 located on the source signal line 5 is removed when the passivation film 18 in the light-transmitting area is removed by patterning, the source signal line 5 may be damaged upon etching the passivation film 18, resulting in defects. Accordingly, by retaining the portion of the passivation film 18 positioned on the source signal line 5 at the time of the patterning of the passivation film 18, it is possible to prevent the source signal line 5 from being damaged upon etching the passivation film 18. The "damage to the source signal line 5" herein includes not only direct damages but indirect damages such as peeling-off of the pattern of the source signal line 5 resulting from damage to the gate insulating film 13 or the substrate 11 positioned below the source signal line 5.

Moreover, by retaining a portion of the passivation film 18 positioned on an ITO film 9b serving as a connecting electrode for connecting a pixel electrode 6 and a drain electrode of the TFT 2, a damage to the ITO film 9b can be prevented.

EXAMPLE 6

Figure 11:
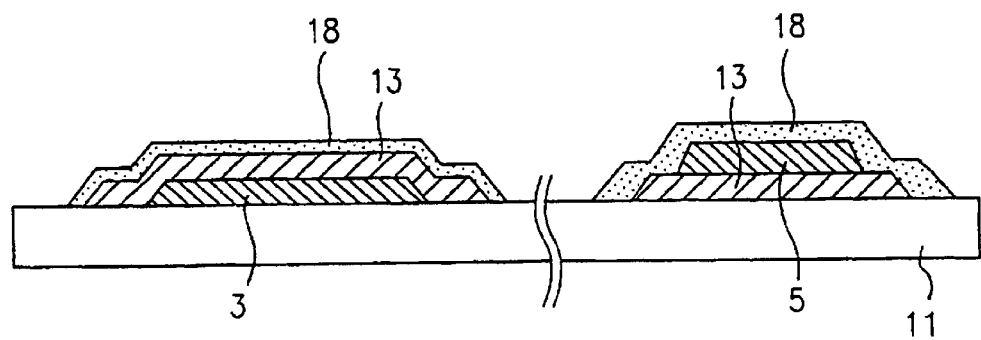
FIG. 11 is a cross-sectional view showing a portion of an active matrix substrate in a liquid crystal display device according to Example 6 of the present invention.

FIG. 11 is a cross-sectional view showing a part of an active matrix substrate in a liquid crystal display device according to Example 6 of the present invention.

According to the active matrix substrate of Example 6, portion of a passivation film 18 positioned above a gate signal line 3 is provided so as to cover the edges of a portion of a gate insulating film 13 located on the gate signal line 3, and a portion of the passivation film 18 on a source signal line 5 is provided so as to cover the edges of a portion of the gate insulating film 13 positioned under the source signal line 5.

The patterning of the gate insulating film 13 and the passivation film 18 made of silicon nitride or the like is performed generally by wet-etching using BHF or the like. The etching rate of the passivation film 18 having a coarse structure is significantly greater than that of the gate insulating film 13 having a dense structure. On the other hand, the etching rate of a glass substrate 11 and that of the passivation film 18 are substantially identical to each other. Furthermore, a contact hole 7 for connecting a drain electrode and a pixel electrode 6 with each other is provided in the passivation film 18. Since a pixel having an insufficiently opened contact hole becomes a bright point on the display, it is necessary to set an etching time for the passivation film 18 sufficiently longer than the time required for just-etching.

Figure 12:
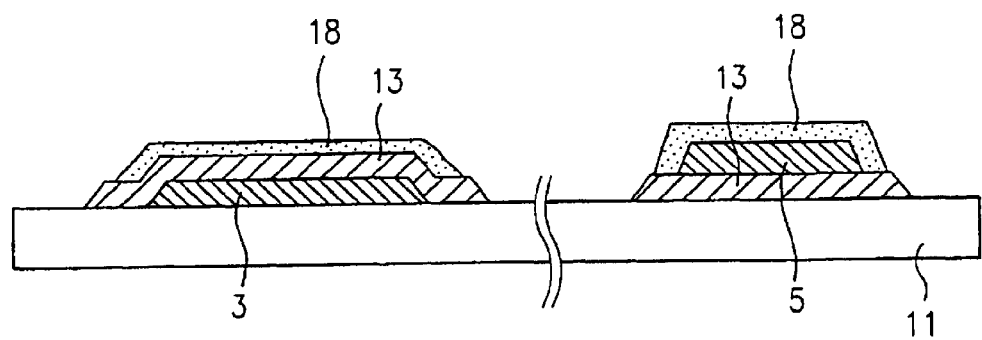
FIG. 12 is a cross-sectional view showing a portion of an active matrix substrate according to Example 6 of the present invention in which a passivation film does not cover the edges of a gate insulating film.

As shown in FIG. 12, in the case where the edges of the gate insulating film 13 are not covered by the passivation film 18, the glass substrate 11 starts to be etched after the just-etching time is passed upon etching the passivation film 18. However, since the etching rate of the gate insulating film 13 is smaller than that of the glass substrate 11, the glass substrate 11 under the edges of the gate insulating film 13 is etched. As a result, the edges of the gate insulating film 13 rise just like a hood and the gate insulating film 13 is thereby peeled off, resulting in defects.

Figure 13:
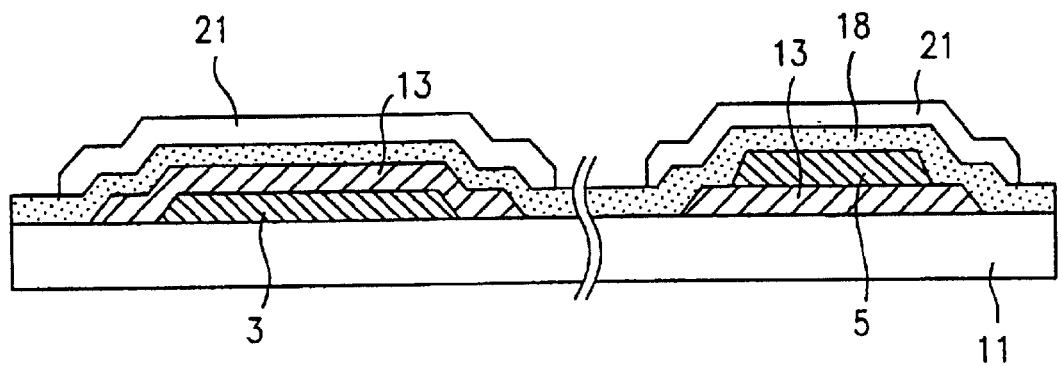
FIG. 13 is a cross-sectional view showing a fabrication step of the active matrix substrate according to Example 6 of the present invention.

Thus, by providing the passivation film 18 so as to cover edges of a gate insulating film 13 portion on the gate signal line 3 and edges of a gate insulating film 13 portion under the source signal line 5 as shown in FIG. 11, the passivation film 18 and a resist pattern 21 are present on the edges of the gate insulating film 13 at the time of the etching of the passivation film 18 as shown in FIG. 13. Accordingly, the substrate 11 under the edges of the gate insulating film 13 can be prevented from being etched. Thus, it is possible to prevent display defects caused by the peeling-off of the gate insulating film 13.

Conditions in a method for fabricating the liquid crystal display device according to Example 6 of the present invention are as follows:

alignment accuracy of mask: 1.5 $\mu$m;

accuracy of finished gate signal line pattern: ±1.5 $\mu$m;

accuracy of finished source signal line pattern: ±1.5 $\mu$m;

width of gate signal line:
  40 $\mu$m for 13.8" XGA (in the case of Cs on Gate),
  23 $\mu$m for 14.1" XGA (in the case of Cs on Com);

width of source signal line:
  13 $\mu$m for 13.8" XGA,
  13 $\mu$m for 14.1" XGA;

mask width of gate insulating film:
  to be set so as to be 4 $\mu$m wider than the finished width of the gate signal line and the source signal line on either side; and mask width of passivation film:
  to be set so as to be 5 $\mu$m wider than the finished width of the gate signal line and the source signal line on either side.

The thus configured liquid crystal display device according to Example 6 of the present invention is compared with the conventional liquid crystal display device in which the gate insulating film and the passivation film are not removed in the light-transmitting area. The results are as follows.

A panel transmittance of the 13.8" XGA is 20.5% in the liquid crystal display device of the present example and 19.8% in the conventional liquid crystal display device. More specifically, the liquid crystal display device according to Example 6 of the present invention has improved panel transmittance by 3.5% over the conventional liquid crystal display device.

Furthermore, the liquid crystal display device according to Example 6 of the present invention has an improved non-defective ratio of the 13.8" XGA by 0.3% to 1.4% over the conventional liquid crystal display device. The reason for the improved non-defective ratio is that it is possible to remove residual film generated during the preceding step when the gate insulating film is patterned so as to remove the film located in the light-transmitting area.

EXAMPLE 7

In the present example, in order to produce a liquid crystal display device, for example, as illustrated in FIG. 11, a passivation film 18 is patterned by dry-etching.

In order to perform dry-etching of silicon nitride, $CF_4+O_2$ gas is generally used. Since the $CF_4+O_2$ gas does not react with a glass substrate 11, the glass substrate 11 under edges of a gate insulating film 13 is not etched even when the edges of the gate insulating film 13 are exposed without being covered with the passivation film 18. As a result, display defects due to the peeling-off of the gate insulating film 13 as were of concern in Example 6 are not generated.

Moreover, since the substrate 11 is not etched upon etching the passivation film 18, the liquid crystal display device of this example has a smaller level difference on the surface of the substrate as compared with the case where wet-etching method is employed. As a result, the planarization of the surface of the substrate can be readily performed using an interlayer insulating film 19 made of photosensitive acrylic resin or the like.

EXAMPLE 8

Figure 14:
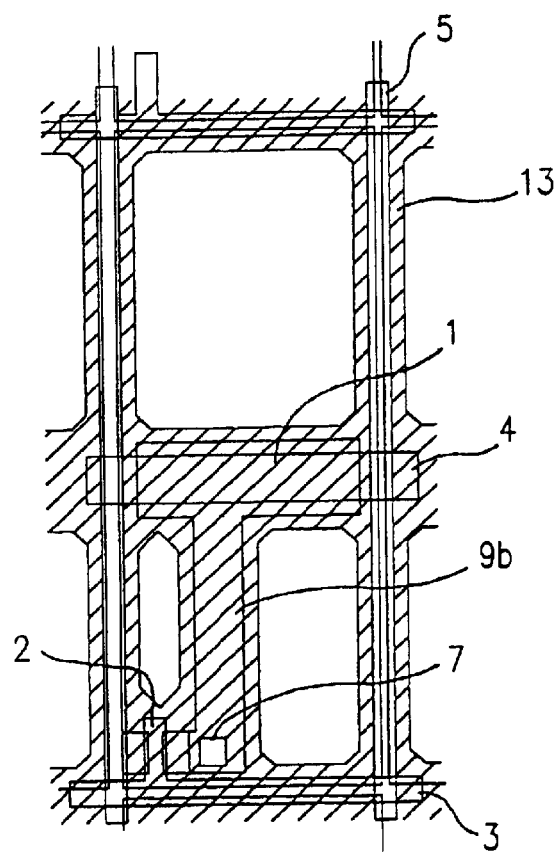
FIG. 14 is a plan view showing a pixel region of an active matrix substrate in a liquid crystal display device according to Example 8 of the present invention.

FIG. 14 is a plan view showing a pixel region of an active matrix substrate in a liquid crystal display device according to Example 8 of the present invention.

In the active matrix substrate of this example, a pattern width of a gate insulating film 13 is increased at a crossing area of a gate signal line 3 and a source signal line 5, a bending portion of a pattern of the gate signal line 3, and a bending portion of a pattern of the source signal line 5.

In the case where each layer is etched by wet-etching, etching defects are likely to be caused by etchant accumulated in the crossing area of the gate signal line 3 and the source signal line 5, the bending portion of the pattern of the gate signal line 3, and the bending portion of the pattern of the source signal line 5 when the substrate is taken out from an etchant tank. Accordingly, such etching defects can be prevented by increasing the pattern width of the gate insulating film 13 at the crossing area of the gate signal line 3 and the source signal line 5, the bending portion of the pattern of the gate signal line 3, and the bending portion of the pattern of the source signal line 5. In addition, the etchant is likely to penetrate into the crossing area of the gate signal line 3 and the source signal line 5, thereby causing a short-circuit between the gate signal line 3 and the source signal line 5.

Thus, by increasing the pattern width of the gate insulating film 13 at the crossing area of the gate signal line 3 and the source signal line 5, it is possible to prevent a short-circuit between the gate signal line 3 and the source signal line 5 caused by such penetration of the etchant.

Similarly, by increasing the pattern width of a passivation film 18 at the crossing area of the gate signal line 3 and the source signal line 5, the bending portion of the pattern of the gate signal line 3, and the bending portion of the pattern of the source signal line 5, problems caused by such etching defects or penetration of etchant can be prevented.

Moreover, by increasing the pattern width of the gate insulating film 13 or that of the passivation film 18 at a bending portion of an ITO film 9b serving as a connecting electrode for connecting a pixel electrode 6 and a drain electrode of a TFT 2 or a crossing area of the source signal line 5 and a pixel capacitance line 4, it is possible to prevent problems caused by the etching defects, the penetration of etchant, or the like at the bending portion or the crossing area.

EXAMPLE 9

Figure 15:
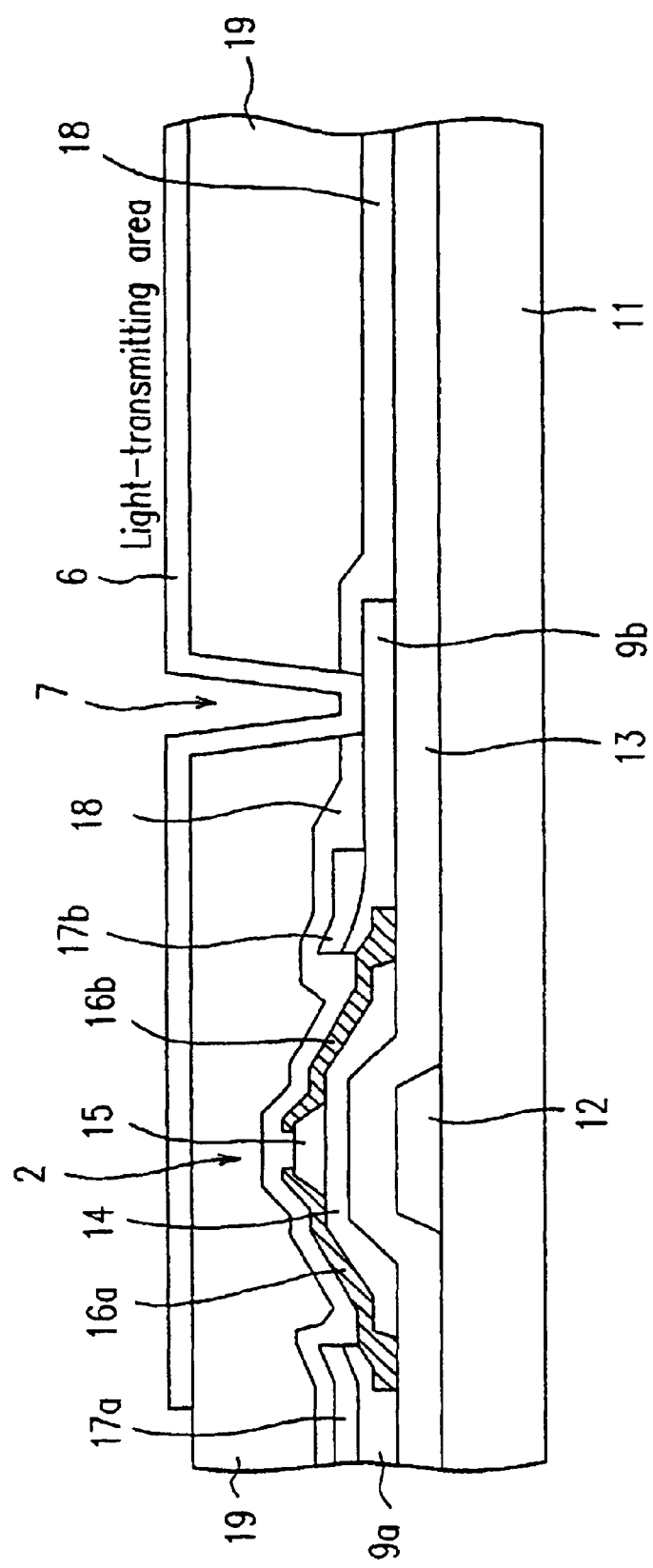
FIG. 15 is a cross-sectional view showing a portion of an active matrix substrate in a liquid crystal display device according to Example 9 of the present invention.

FIG. 15 is a cross-sectional view showing a portion of an active matrix substrate in a liquid crystal display device according to Example 9 of the present invention.

The active matrix substrate of the present example includes a gate insulating film 13 provided on a transparent insulating substrate 11 so as to cover a gate signal line 3 and a gate electrode 12 which is a part of the gate signal line 3 both in a light-transmitting area and a region excluding the light-transmitting area. The active matrix substrate also includes a passivation film 18 made of an inorganic thin film, covering a TFT 2, a source signal line 5, and a connecting electrode both in the light-transmitting area and the region excluding the light-transmitting area, and an interlayer insulating film 19 provided thereon, which is made of an organic thin film having a high transparency and a refractive index n19 in the range of about 1.8 to about 2.0.

Figure 16:
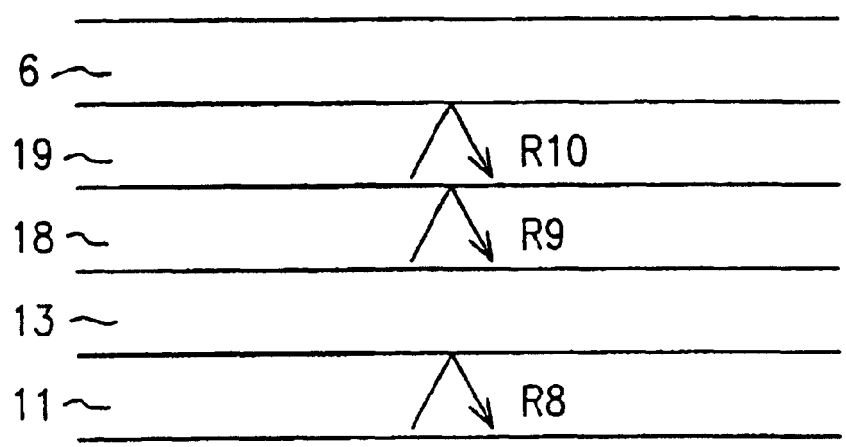
FIG. 16 is a view illustrating the structure of films in a light-transmitting area of the active matrix substrate in the liquid crystal display device according to Example 9 of the present invention.

According to the liquid crystal display device of the present example, as shown in FIG. 16, the gate insulating film 13, the passivation film 18, the interlayer insulating film 19, and a pixel electrode 6 are sequentially provided in this order on the transparent insulating substrate 11 in a light-transmitting opening of the active matrix substrate. In such a configuration, the refractive index n11 of the substrate 11 is in the range of about 1.5 to about 1.6. In the case where a Si—N film is used as the gate insulating film 13, the refractive index n13 of the gate insulating film 13 is in the range of about 1.8 to about 2.0.

When light is incident from the side of the substrate 11, a reflectance R8 (%) at an interface of the substrate 11 and the gate insulating film 13 is represented by:

$$R8=(n11-n13)^2/(n11+n13)^2 \times 100.$$

In the case where a Si—N film is used as the passivation film 18, the refractive index n18 of the passivation film 18 is in the range of about 1.8 to about 2.0, and the refractive index n19 of the interlayer insulating film 19 is in the range of about 1.8 to about 2.0. When light is incident from the side of the substrate 11, a reflectance R9 (%) at an interface of the passivation film 18 and the interlayer insulating film 19 is represented by:

$$R9=(n18-n19)^2/(n18+n19)^2 \times 100.$$

In the case where the refractive index n19 of the interlayer insulating film 19 is in the range of about 1.8 to about 2.0, and an ITO film is used as the pixel electrode 6, the refractive index n6 of the pixel electrode 6 is in the range of about 1.8 to about 2.0. When light is incident from the side of the substrate 11, a reflectance R10 (%) at an interface of the interlayer insulating film 19 and the pixel electrode 6 is represented by:

$$R10=(n19-n6)^2/(n19+n6)^2 \times 100.$$

When the reflection at the interface of the substrate 11 and the gate insulating film 13, the reflection at the interface of the passivation film 18 and the interlayer insulating film 19, and the reflection at the interface of the interlayer insulating film 19 and the pixel electrode 6 are taken into consideration, a reflectance R12 (%) in an opening through which light transmits is represented by:

$$R12=R11+(100-R11)/100 \times R10, \text{ wherein, } R11=R8+(100-R8)/100 \times R9.$$

Figure 17:
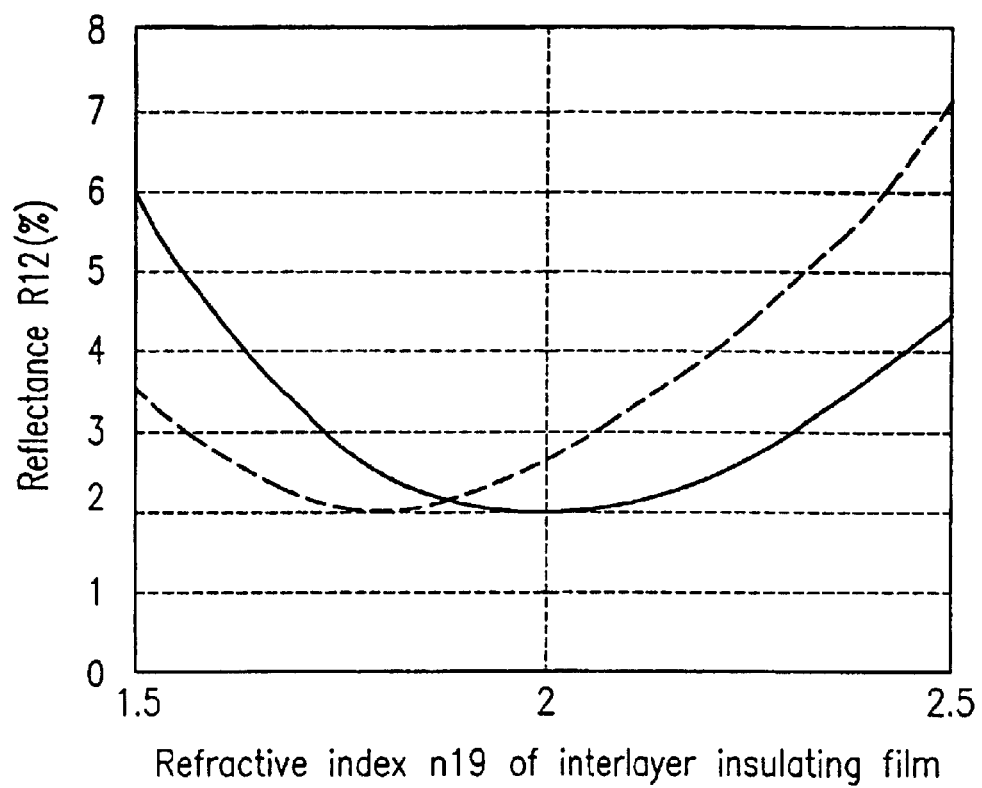
FIG. 17 is a graph showing the relationship between a refractive index n19 of an interlayer insulating film and a reflectance R12 in the liquid crystal display device according to Example 9 of the present invention.

In FIG. 17, a relationship between the refractive index n19 of the interlayer insulating film 19 and a reflectance R12 in the case of n13=n18=n6=2.0 is shown by a solid line, and a relationship between the refractive index n19 of the interlayer insulating film 19 and a reflectance R12 in the case of n13=n18=n6=1.8 is shown by a broken line. As can be seen from the figure, when the refractive index n19 of the interlayer insulating film 19 is in the range of about 1.8 to about 2.0, R12 which is determined by the combination of the aforementioned R8, R9, and R10 reaches its minimum at about 2.0%. When the refractive index n19 of the interlayer insulating film 19 is out of this range, the amount of transmitted light in the light-transmitting opening is attenuated, thereby reducing light transmittance.

As described above, since the liquid crystal display device of Example 9 has the interlayer insulating film 19 with the refractive index n19 in the range of about 1.8 to about 2.0, even when the gate insulating film 13 and the passivation film 18 are present between the substrate 11 and the interlayer insulating film 19 in the light-transmitting area, the brightness of the white display can be improved, thereby realizing low power consumption.

Figure 18:
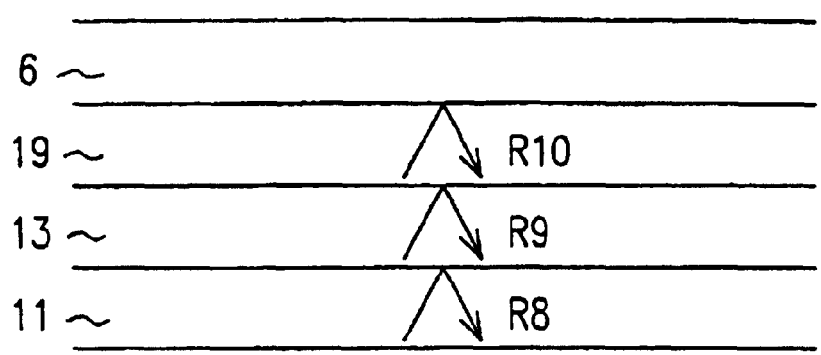
FIG. 18 is a view illustrating the structure of films in a light-transmitting area of an active matrix substrate in another liquid crystal display device according to Example 9 of the present invention.
Figure 19:
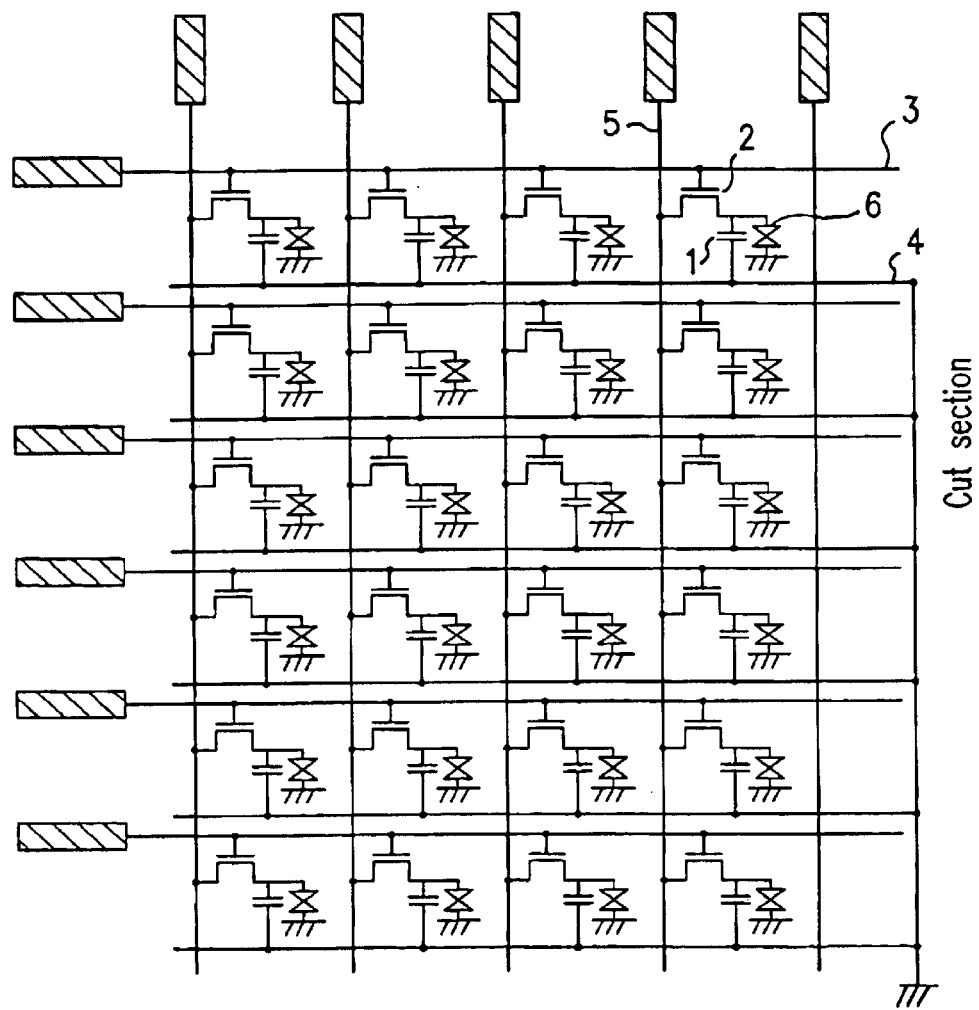
FIG. 19 is a view showing an equivalent circuit of a conventional liquid crystal display device.
Figure 20:
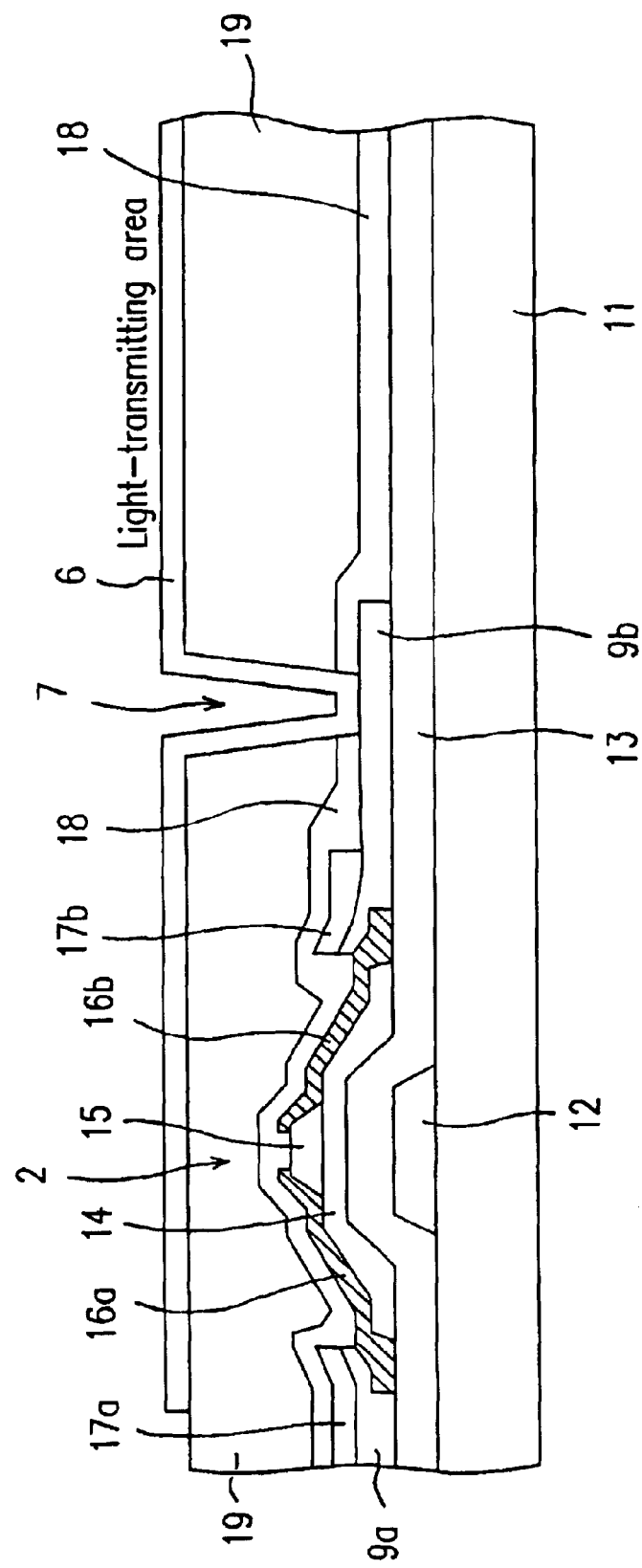
FIG. 20 is a cross-sectional view showing a conventional active matrix substrate.

Similarly, as shown in FIG. 18, even when the passivation film 18 is not present but the gate insulating film 13 is present between the substrate 11 and the interlayer insulating film 19 in the light-transmitting area, the brightness of the white display can be improved, thereby realizing the liquid crystal display device with low power consumption.

As a material for the interlayer insulating film 19 having a refractive index n19 in the range of about 1.8 to about 2.0, an inorganic film such as MgO, SiO, ThO$_2$, Pr$_6$O$_{11}$, ZrO$_2$, and Ti$_x$O$_y$, for example, may be used. Alternatively, an organic film or the like may be used.

Depending on the light transmittance, dielectric constant, or the like, even when the refractive index n19 of the interlayer insulating film 19 is not in the range of about 1.8 to about 2.0, if the refractive index n19 has a value close to such a range, it is possible to obtain a satisfactory light transmittance at the opening which is the light-transmitting area. Thus, if the refractive index n19 of the interlayer insulating film 19 has a value close to the range of about 1.8 to about 2.0, a bright display can be realized.

As described above in detail, according to the present invention, the interlayer insulating film directly contacts the substrate in the light-transmitting area. As a result, light reflection resulting from differences in refractive indexes at the interface of the substrate and the gate insulating film and at the interface of the passivation film and the interlayer insulating film does not occur. Thus, light transmittance can be improved, thereby realizing a bright display.

Moreover, in the case where the gate insulating film and the passivation film are provided between the substrate and the interlayer insulating film positioned in the region excluding the light-transmitting area, since the passivation film made of an inorganic thin film is present between the interlayer insulating film and the switching element, the reliability of the switching element can be improved.

Alternatively, in the case where the gate insulating film is provided and no passivation film is provided between the substrate and the interlayer insulating film positioned in the region excluding the light-transmitting area, a level difference between the light-transmitting area and the region excluding the light-transmitting area becomes small. Thus, it is easy to planarize the surface of the substrate by the interlayer insulating film, thereby improving display characteristics. In addition, since the step of patterning the passivation film is not required, the fabrication steps are simplified, thereby reducing the cost of the liquid crystal display device.

If the refractive index of the interlayer insulating film is in the range of about 1.5 to about 2.0, differences in refractive indexes at the interface of the substrate and the interlayer insulating film and at the interface of the interlayer insulating film and the pixel electrode can be reduced. Accordingly, it is possible to increase light transmittance, thereby realizing bright display.

When the gate insulating film is patterned, it is possible to prevent defects due to the breakage of the scanning line and the signal line by removing the portion of the film covering the light-transmitting area while retaining the film portions positioned on the gate electrode and the scanning line, and under the signal line. When the passivation film is patterned, it is possible to prevent defects of the gate insulating film or defects due to the breakage of the scanning line and the signal line by removing the portion of the film covering the light-transmitting area while retaining the film portions positioned on the switching element, the scanning line, and the signal line. Thus, it is possible to improve the light transmittance of the liquid crystal display device without reducing its non-defective ratio.

Also, according to another example of the present invention, since the refractive index of the interlayer insulating film is in the range of about 1.8 to about 2.0, even when the gate insulating film or the passivation film is present between the interlayer insulating film and the substrate in the light-transmitting area, a reduction in transmittance due to light reflection is not caused, thereby realizing bright display.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display device comprising a pair of substrates provided so as to face each other with a display medium interposed therebetween, and further comprising, on a first substrate of the pair of substrates:

switching elements disposed in a matrix;

canning lines and signal lines disposed so as to cross each other;

an interlayer insulating film formed of an organic thin film and provided so as to cover the switching elements, the scanning lines and the signal lines on one surface thereof, and pixel electrodes on the other surface thereof, wherein each of the pixel electrodes being electrically connected to a drain electrode of one of the switching elements via a contact hole which penetrates through the interlayer insulating film, wherein the interlayer insulating film covers and is in contact with a light-transmitting area of the first substrate which is not shaded by the switching elements, the scanning lines and the signal lines, wherein a refractive index of the interlayer insulating film is about between a refractive index of the first substrate and a refractive index of the pixel electrodes, a gate insulating film provided on a gate electrode of each of the switching elements and on the scanning lines, and is under the signal lines between the first substrate and the interlayer insulating film in a region excluding the light-transmitting area, and the gate insulating film is a first patterned film covering both the light-transmitting area and the region excluding the light-transmitting area on the first substrate and is then partially removed in the light-transmitting area while retained on the gate electrodes and the scanning lines and under the signal lines, wherein a pattern width of the gate insulating film is increased at respective crossing areas of the scanning lines and the signal lines, at a bending portion of a pattern of the scanning lines, and at a bending portion of a pattern of the signal lines.

2. A display device comprising:

a pair of substrates sandwiching a display medium, switching elements disposed in a matrix on a first substrate of the pair of substrates;

scanning lines and signal lines disposed on the first substrate so as to cross each other on a first substrate of the pair of substrates, and a matrix of pixel electrodes;

an interlayer insulating film between the switching elements, the scanning lines and signal lines on one side of the interlayer insulating film, and the pixel electrodes on an opposite side of the interlayer insulating film, wherein contact holes in the interlayer insulating film provide for electrical connections between each of the pixel electrodes and a respective one of said switching elements;

wherein the interlayer insulating film is an organic film having a high transparency and is in contact with a light transmitting area on the first substrate, where the light-transmitting area excludes the switching elements, the scanning lines and the signal lines;

wherein a refractive index of the interlayer insulating film is about between a refractive index of the first substrate and a refractive index of the pixel electrodes, an inorganic thin film passivation film covering the switching elements, the scanning lines and the signal lines and a region excluding the light-transmitting area;

wherein the passivation film is a second patterned film covering the region excluding the light-transmitting area on the first substrate, and wherein a gate insulating film and the passivation film are between the first substrate and the interlayer insulating film, and the gate insulating film;

the gate insulating film is being provided on a gate electrode of each of the switching elements and on the scanning lines, and under the signal lines;

wherein the gate insulating film is a first patterned film covering both the light-transmitting area and the region excluding the light-transmitting area on the first substrate and then partially removed in the light-transmitting area while retained on the gate electrodes and the scanning lines and under the signal lines, wherein a pattern width of the passivation film is increased at respective crossing areas of the scanning lines and the signal lines, at a bending portion of a pattern of the scanning lines, and at a bending portion of a pattern of the signal lines.

* * * * *